Figure 1:
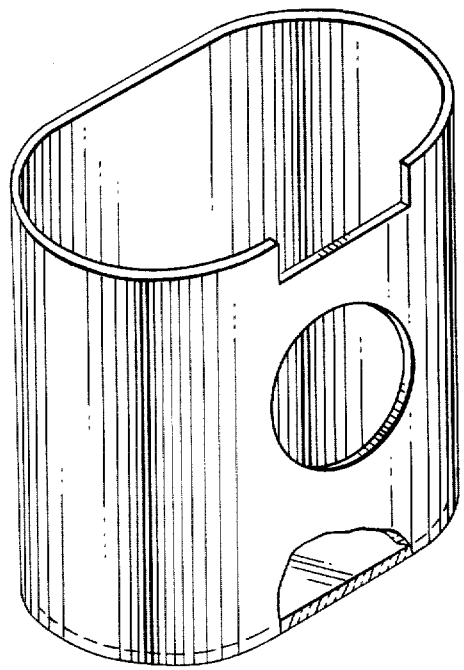

Aug. 13, 1963   J. P. REX, JR., ET AL   3,100,734
FURNACE COMBUSTION CHAMBER
Filed Sept. 23, 1960

INVENTORS
JOHN P. REX, JR.
THOMAS B. ARRINGTON
BY DONALD J. PELLEGRINO

ATTORNEYS

United States Patent Office 3,100,734
Patented Aug. 13, 1963

3,100,734
FURNACE COMBUSTION CHAMBER
John P. Rex, Jr., Birmingham, Thomas B. Arrington, Detroit, and Donald J. Pellegrino, Royal Oak, Mich., assignors to Rex Roto Corporation, Walled Lake, Mich., a corporation of Michigan
Filed Sept. 23, 1960, Ser. No. 58,087
4 Claims. (Cl. 162—152)

The invention relates to a furnace combustion chamber and more particularly to a chamber adaptable for oil-fired furnace units. This product employs refractory fibers molded into required shapes and reinforced by organic and inorganic binders varied in proportions determined by temperature and strength requirements.

It is the principal object of the present invention to provide a furnace chamber of reduced size and weight as compared to conventional chambers and which may be fabricated as a single unit installed by the furnace manufacturer rather than as conventional multiple parts assemblies which must be separately packaged and installed at the site of furnace installation. The present chamber makes it possible to reduce the wall thickness of conventional chambers manufactured from cement and refractory materials in the order of 1½ inches to approximately $\frac{3}{16}$ inch and to markedly reduce the overall size of the chamber thereby meeting the requirements of furnace manufacturers who have reduced furnace sizes. The new chamber makes possible a weight reduction from approximately 54 pounds for a comparable chamber of the conventional type to approximately eighteen ounces, resulting in economies of manufacturing, assembly and shipping costs. Notwithstanding the thin wall light-weight construction, this new chamber will withstand continuous use temperatures of 2300° F. and will maintain its shape throughout temperature changes and resist spalling, cracking and other types of thermal shock.

Figure 2:
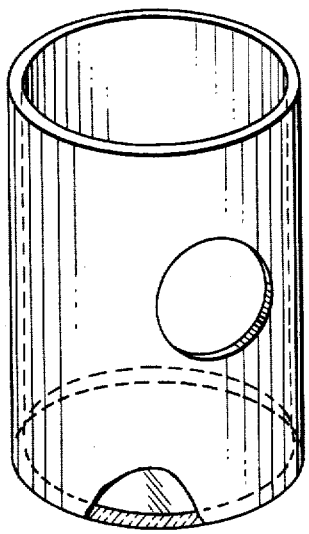

These and other objects and advantages of this invention will be understood from the following description of the two particular embodiments of the invention as disclosed in the drawings wherein:

FIGURE 1 is a one-piece molded furnace chamber formed with parallel walls joined by semi-cylindrical ends; and FIGURE 2 is a similar furnace chamber having a cylindrical configuration.

It will be understood from the following description these are merely typical embodiments as the flexibility of the manufacturing process facilitates production of a furnace chamber of practically any required size and shape.

The preferred materials employed in manufacturing these furnace chambers are aluminum silicate fibers, a colloidal silica primary binder and a suitable organic secondary binder. A typical specification for the aluminum silicate fiber would be as follows:

Color _____ White.
Fiber length _____ Short to 1½ inches.
Fiber diameter _____ Submicron to 10 microns, mean of 2½ microns.
Specific gravity _____ 2.73.
Bulk density as shipped ___ 4 lbs. per cubic foot.
Recommended packing density _____ 6 lbs. per cubic foot or higher.
Use temperature _____ Up to 2300° F.
Melting point _____ Above 3200° F.

The approximate chemical analysis of this material in percentage by weight is as follows:

| | Percent |
|---|---|
| $Al_2O_3$ | 51.2 |
| $SiO_2$ | 47.4 |
| $B_2O_3$ | 0.7 |
| $Na_2O$ | 0.7 |

These fibers are placed in a tank containing water and a colloidal silica which has the following properties:

Percent colloidal silica as $SiO_2$ _____ 30.0.
Ratio, wt., $SiO_2/Na_2O$ _____ 95.
Chloride as NaCl _____ 0.04%.
Sulfate as $Na_2SO_4$ _____ 0.05%.
Viscosity at 25° C., cps. _____ 3.6.
pH at 25° C. _____ 9.8.
Surface area B.E.T. method $m.^2/g.$, silica _____ 210.
Approximately particle diameter _____ 15 mu.
Turbidity _____ 21.
Stability _____ Stable, except toward freezing which causes irreversible precipitation. Freezing point 32° F.

The silica is insoluble once the colloidal solution has dried. It also has the property of gel formation whereby small silica particles link together to form a strong aggregate structure.

In order to form a uniform and homogeneous structure, it is important to disperse the fibers uniformly in the solution. A foraminous mold having an exterior surface conforming with the interior configuration of the furnace chamber is submerged into the solution which is drawn by vacuum through the mold causing the fibers to be deposited upon the mold surface. The wall thickness of the furnace chamber is determined by the amount of time that the mold is left submerged in the solution. The mold is then withdrawn from the solution and by means of vacuum, the furnace chamber is removed from the mold and thoroughly dried, whereupon it becomes a self-supporting unit.

The furnace chamber at this stage has satisfactory properties for furnace use but may not have sufficient strength or abrasive resistance to withstand damage from packing, shipping to a furnace manufacturer and installation in the heating unit. Accordingly, an organic binder is preferably added to meet these requirements, either initially as part of the mix or as an exterior coating after the chamber is dried.

A range of bulk density and strength is possible generally in proportion to the amount of binder solids employed. The ratio of inorganic binder to fibers when dried may range from 2% to 25% with a 10% weight ratio preferred, which gives sufficient strength for self-support after firing without the hazard of checking. The ratio of organic binder to fiber may range up to 5% and preferably is in the order of 1% when applied as an exterior coating.

The secondary inorganic binder is not necessitated by any inherent weakness in the inorganic binder but rather because it is desirable to maintain the concentration of the inorganic binder at a low level. The inorganic binder is of course eliminated upon firing. Various types have proved satisfactory such as vinyl, polymers, phenolics, polyesters and epoxies.

Furnace chambers manufactured with the foregoing materials and methods are light in weight, adaptable as to size and shape, stable, thin-walled, easy to install or replace, suitable for operating temperatures up to 2300° F., resistant to thermal shock such as cracking and spalling, and provide a high order of combustion efficiency with minimum heating and cooling time, and a high degree of durability.

While a preferred embodiment of the furnace combustion chamber and method of manufacture have been described above in detail, it will be understood that numerous modifications might be resorted to without departing from the scope of the invention as defined in the following claims.

We claim:

1. A combination chamber, said chamber comprising a fibrous refractory material, said material being formed into an enclosure, said enclosure having a substantially uniform wall thickness, said wall thickness being a fractional part of an inch, said enclosure having a burner opening, said enclosure having a burned gas outlet, said fibrous material as formed into said enclosure being held in a stable self supporting structural furnace combustion chamber form by an inorganic refractory colloidal binder.

2. A combustion chamber as set forth in claim 1 wherein the refractory fibrous material comprises aluminum silicate fiber.

3. A combustion chamber as set forth in claim 1 wherein the refractory fibrous material comprises aluminum silicate fiber and wherein said refractory binder comprises colloidal silicon dioxide.

4. A combusion chamber as set forth in claim 3 including in addition an organic binder.

References Cited in the file of this patent

UNITED STATES PATENTS

| | | |
|---|---|---|
| 2,101,921 | Shaver | Dec. 14, 1937 |
| 2,107,779 | Brown | Feb. 8, 1938 |
| 2,695,849 | McMullen | Nov. 30, 1954 |
| 2,717,830 | Bjorkman | Sept. 13, 1955 |
| 2,731,359 | Nicholson | Jan. 17, 1956 |
| 2,914,107 | Gaines | Nov. 24, 1959 |

OTHER REFERENCES

Callinan: Manufacture and Properties of Paper Made From Ceramic Fibers, NRL Report 4044, pages 1–7, Oct. 20, 1952.

UNITED STATES PATENT OFFICE
CERTIFICATE OF CORRECTION

Patent No. 3,100,734                      August 13, 1963

John P. Rex, Jr., et al.

It is hereby certified that error appears in the above numbered patent requiring correction and that the said Letters Patent should read as corrected below.

Column 2, line 18, for "Approximately" read -- Approximate --; column 3, line 14, strike out "combination" and insert instead -- furnace combustion --; column 3, line 23, and column 4, line 3, after "A", each occurrence, insert -- furnace --; column 4, line 7, for "A combusion" read -- A furnace combustion --.

Signed and sealed this 3rd day of March 1964.

(SEAL)
Attest:
ERNEST W. SWIDER                      EDWIN L. REYNOLDS

Attesting Officer                       Acting Commissioner of Patents